US010224523B2

(12) United States Patent
Yu et al.

(10) Patent No.: US 10,224,523 B2
(45) Date of Patent: Mar. 5, 2019

(54) SECONDARY BATTERY POUCH WITH ENHANCED INSULATION PROPERTY, AND METHOD FOR MANUFACTURING SAME

(71) Applicant: LG CHEM, LTD., Seoul (KR)

(72) Inventors: Hyung-Kyun Yu, Daejeon (KR); Sang-Hun Kim, Daejeon (KR); Joo-Sung Lee, Daejeon (KR); Soo-Ji Hwang, Daejeon (KR); Won-Pill Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 148 days.

(21) Appl. No.: 15/124,812

(22) PCT Filed: Jul. 31, 2015

(86) PCT No.: PCT/KR2015/008069
§ 371 (c)(1),
(2) Date: Sep. 9, 2016

(87) PCT Pub. No.: WO2016/018129
PCT Pub. Date: Feb. 4, 2016

(65) Prior Publication Data
US 2017/0025648 A1   Jan. 26, 2017

(30) Foreign Application Priority Data

Jul. 31, 2014  (KR) .......................... 10-2014-0098454

(51) Int. Cl.
*H01M 2/08*   (2006.01)
*H01M 2/02*   (2006.01)
*H01M 10/04*  (2006.01)

(52) U.S. Cl.
CPC ............... *H01M 2/08* (2013.01); *H01M 2/02* (2013.01); *H01M 2/0275* (2013.01); *H01M 2/0287* (2013.01); *H01M 10/04* (2013.01); *H01M 10/0431* (2013.01)

(58) Field of Classification Search
CPC .... H01M 2/02; H01M 2/0275; H01M 2/0287; H01M 2/08; H01M 10/04; H01M 10/0431
USPC ....................................................... 429/185
See application file for complete search history.

(56) References Cited

U.S. PATENT DOCUMENTS

| 6,107,396 A    | * | 8/2000  | Kweon .................. C07C 29/70 |
|                |   |         |                           524/779 |
| 9,525,189 B2   |   | 12/2016 | Ogata                              |
| 2003/0128737 A1| * | 7/2003  | McGrath ................ G01K 11/20 |
|                |   |         |                           374/161 |
| 2007/0009794 A1|   | 1/2007  | Takami et al.                      |
| 2007/0196733 A1| * | 8/2007  | Lee .......................... H01M 2/08 |
|                |   |         |                           429/185 |
| 2012/0156546 A1| * | 6/2012  | Amano .............. C08G 59/4014 |
|                |   |         |                           429/149 |
| 2013/0071696 A1|   | 3/2013  | Kim et al.                         |

FOREIGN PATENT DOCUMENTS

| EP | 0973212 A1     | 1/2000  |
| JP | 2001-250515 A  | 9/2001  |
| JP | 2004-75914 A   | 3/2004  |
| JP | 2006-107894 A  | 4/2006  |
| JP | 2013-65565 A   | 4/2013  |
| JP | 2013-219006 A  | 10/2013 |
| KR | 10-2004-0054113 A | 6/2004 |
| KR | 10-2009-0008086 A | 1/2009 |
| KR | 10-2010-0032064 A | 3/2010 |
| KR | 10-0956397 B1  | 5/2010  |
| KR | 10-2014-0061153 A | 5/2014 |

OTHER PUBLICATIONS

Machine translation of KR1020090112371, published on May 6, 2010 (Year: 2010).*
Machine translation of JP 2013-219006, published on Oct. 24, 2013 (Year: 2013).*
International Search Report for PCT/KR2015/008069 dated Oct. 27, 2015.

* cited by examiner

*Primary Examiner* — Anca Eoff
(74) *Attorney, Agent, or Firm* — Birch, Stewart, Kolasch & Birch, LLP

(57) ABSTRACT

The present disclosure relates to a secondary battery pouch with an enhanced insulation property, and a method for manufacturing the same, and more specifically, to a secondary battery pouch for preventing occurrence of cracks in a sealing portion of a periphery of a pouch in a completed pouch-type secondary battery, particularly at a folded portion of the sealing portion, and a method for manufacturing the same.

11 Claims, 2 Drawing Sheets

SECONDARY BATTERY POUCH WITH ENHANCED INSULATION PROPERTY, AND METHOD FOR MANUFACTURING SAME

TECHNICAL FIELD

The present application claims priority to Korean Patent Application No. 10-2014-0098454 filed on Jul. 31, 2014 in the Republic of Korea, the disclosures of which are incorporated herein by reference.

The present disclosure relates to a secondary battery pouch with an enhanced insulation property, and a method for manufacturing the same, and more specifically, to a secondary battery pouch designed to prevent the occurrence of cracks in a sealing portion of a periphery of a pouch in a pouch-type secondary battery, particularly in a portion to be folded, and a method for manufacturing the same.

BACKGROUND ART

With the growing use of portable electric products such as video cameras, mobile phones, and portable computers, significance of secondary batteries being mainly used as a power source on which the portable electric products work are increasing. In particular, a lithium secondary battery has a high energy density per unit weight and allows quick charging, when compared with other conventional secondary batteries such as a lead storage battery, a nickel-cadmium battery, a nickel-hydrogen battery and a nickel-zinc battery, and so on, and thus, its use is on an upward trend.

A lithium secondary battery has a relatively higher operating voltage compared with other secondary batteries such that it is used as a power supply of a portable electronic device with an operating voltage of 3.6V or more, or a plurality of lithium secondary batteries are connected in series with each other to thereby be used for a high output hybrid automobile.

Can-type lithium batteries using a metal can as a container mostly use a cylindrical or prismatic metal can as a container and are sealed therein by welding. The can-type secondary battery has a fixed shape and thus limits the design of an electric product which uses the battery as a power source. In addition, it is difficult to decrease the volume of the product. Therefore, a pouch-type secondary battery prepared by putting a cathode, anode, separator, and electrolyte into a pouch package formed of a film and then sealing the same has been developed and used.

A typical secondary battery pouch is formed in a multi-layer structure by sequentially stacking an inner resin layer such as polyolefin-based resin layer which has thermal adhesive property to serve as sealing material, a metal foil layer such as an aluminum layer serving as both a substrate which maintains mechanical strength and a barrier layer against moisture and oxygen, and an outer resin layer such as a nylon layer serving as a substrate layer and a protective layer. The polyolefin-based resin layer may typically be formed of casted polypropylene (CPP).

The case formed of pouch is advantageous in that the shape is variable, and secondary batteries with the pouch can have the same capacity with less volume and weight, compared to secondary batteries having other case. However, since a soft material is used in a pouch, unlike the can-type case, there is a shortcoming that the mechanical strength and sealing reliability of pouch may be low.

After the pouch receives an electrode assembly and electrolyte, the pouch is heat-sealed at its periphery. In particular, recently, study for pursuing miniaturization and high-energy of secondary batteries by folding the pouch sealing portion that is not directly related with a battery capacity or an accommodating function is ongoing.

However, because the inner resin layer of the pouch melts and then crystallizes during heat-sealing of its periphery, cracking may occur by the subsequent process of folding a folding portion of the pouch. At this time, when the inner resin layer is even slightly ruptured, the metal layer of the pouch is exposed to inside of the battery, then side reaction occurs from reaction with the electrolyte. When the side reaction occurs, an active layer of the electrode is mechanically collapsed, thus facilitating water penetration such that the life of the battery is then rapidly decreased.

Accordingly, in order to prevent the breakdown of the insulation resistance due to cracks of the folding portion, an alternative such as adjusting folding angles has been suggested, but the situation is still in need of improvement.

DISCLOSURE

Technical Problem

The present disclosure is directed to providing a secondary battery pouch with an enhanced insulation property, preventing the occurrence of cracks after folding a sealing portion of the pouch, and a secondary battery using the pouch as an exterior material.

Furthermore, the present disclosure is directed to providing a method for manufacturing a secondary battery pouch and a pouch-type secondary battery.

Technical Solution

In one aspect of the present disclosure, there is provided a secondary battery pouch in which microcapsules of core-shell structure are applied between an inner resin layer of an upper pouch and an inner resin layer of a lower pouch along a to-be-folded portion of the pouch, in which the core-shell microcapsules include an elastic thermoplastic resin in the cores thereof.

At least a portion of the shell may be melted or destructed by thermal bonding process at from 170° C. to 200° C. Then, the elastic thermoplastic resin included in the cores of the core-shell microcapsules may be leaked.

The elastic thermoplastic resin may have a property of melting at from 170° C. to 200° C. and then curing.

The elastic thermoplastic resin may be one or a mixture of at least two selected from epoxy compounds, acrylic compounds, silicones, rubber, polyurethanes, and elastomer.

Further, the core-shell microcapsules may have an average diameter in the range from 0.5 μm to 2 μm.

Furthermore, a thickness of the shell in the core-shell microcapsules may correspond to from ⅕ to ⅒ the diameter of the microcapsules.

In addition, the shell may be one or a mixture of at least two selected from the group consisting of polyester, polyethylene, polyethylene terephthalate, polypropylene, polystyrene, polycarbonate, polyvinyl chloride, polymethyl methacrylate, polyacetal, polyoxymethylene, polybutylene terephthalate, acrylonitrile-butadiene-styrene and ethylene-vinyl alcohol copolymer.

In another aspect of the present disclosure, there is also provided a pouch-type secondary battery comprising an electrode assembly including a cathode, an anode and a separator interposed between the cathode and the anode; and a secondary battery pouch having an upper pouch, and a lower pouch in which an accommodating portion is formed for receiving the electrode assembly, wherein cured elastic thermoplastic resin is further formed at folded portion of the pouch.

The cured elastic thermoplastic resin may be from one or a mixture of at least two selected from epoxy compounds, acrylic compounds, silicones, rubber, polyurethanes, and elastomer.

In still another aspect of the present disclosure, there is also provided a method for manufacturing a secondary battery pouch, comprising applying microcapsules of a core-shell structure including an elastic thermoplastic resin in the cores, between an inner resin layer of an upper pouch and an inner resin layer of a lower pouch along a to-be-folded portion of the pouch.

The microcapsules may be applied by screen printing, inkjet printing or laser printing.

In still another aspect of the present disclosure, there is also provided a method for manufacturing a pouch-type secondary battery, comprising receiving an electrode assembly in the secondary battery pouch described above; heat-sealing a periphery of the secondary battery pouch; and folding a sealing portion.

The heat-sealing may be performed by the thermal bonding which is carried out at a temperature ranging from 170° C. to 200° C.

Advantageous Effects

The present disclosure gives the following effects. In one aspect of the present disclosure, a specific resin is further interposed in a to-be-folded portion of a sealing portion (hereinafter, 'foldable portion') of a pouch for an electrochemical device such that cracks do not occur at a folding portion even after folding.

Accordingly, there is an effect that the destruction of insulation characteristics due to the folding portion cracks is prevented.

DESCRIPTION OF DRAWINGS

Other objects and aspects of the present disclosure will become apparent from the following descriptions of the embodiments with reference to the accompanying drawings in which.

BEST MODE

Figure 1:
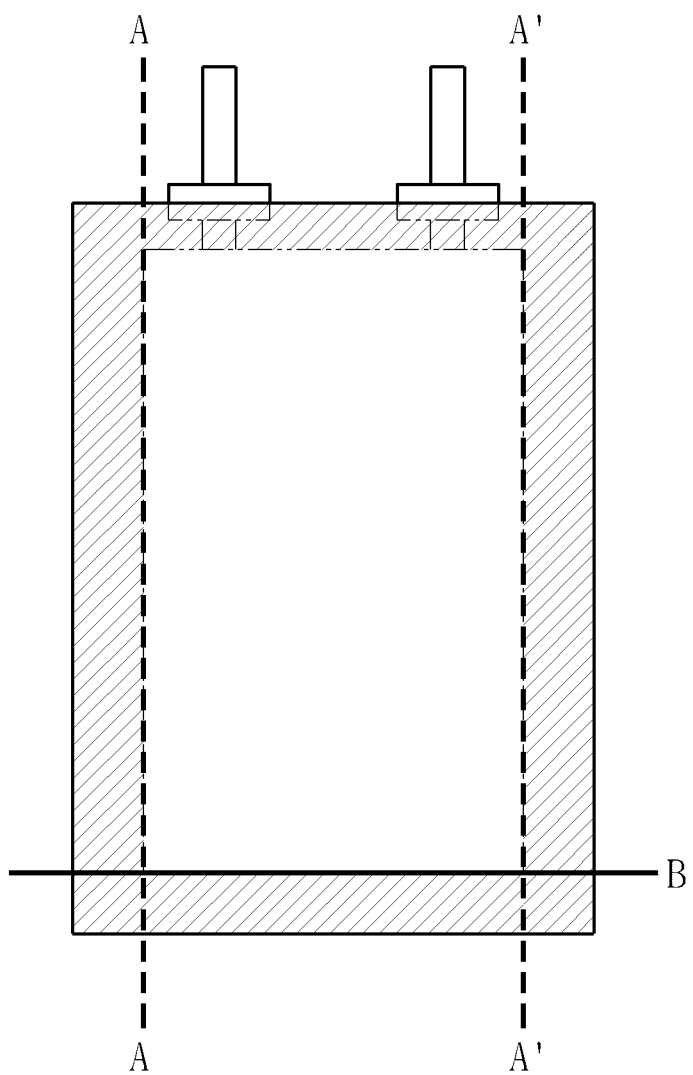
FIG. 1 is a view schematically showing a portion to be folded in a pouch-type secondary battery.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one aspect of the present disclosure, a secondary battery pouch is applied with microcapsules of core-shell structure between an inner resin layer of an upper pouch and an inner resin layer of a lower pouch along a to-be-folded portion of the pouch, in which the microcapsules have a structure in which an elastic thermoplastic resin is included in the core.

In another aspect of the present disclosure, a pouch-type secondary battery may include an electrode assembly including a cathode, an anode and a separator interposed between the cathode and the anode; and a secondary battery pouch having an upper pouch, and a lower pouch in which an accommodating portion is formed for receiving the electrode assembly therein, in which a sealing portion is formed in two or three sides forming the pouch, the sealing portion is folded, and cured elastic thermoplastic resin is further formed in the folded portion of the pouch.

In still another aspect of the present disclosure, a method for manufacturing a secondary battery pouch may include applying microcapsules of a core-shell structure including an elastic thermoplastic resin in the cores, between an inner resin layer of an upper pouch and an inner resin layer of a lower pouch along a to-be-folded portion of the pouch.

In still another aspect of the present disclosure, a method for manufacturing a pouch-type secondary battery is provided, which may include receiving the secondary battery in the secondary battery pouch prepared described above; heat-sealing a periphery of the secondary battery pouch; and folding a sealing portion. However, the order of processes of applying microcapsules in a to-be-folded portion and receiving an electrode assembly in the pouch may be changed, if necessary.

A metal foil layer constituting the pouch serves to maintain a proper thickness, to prevent penetrating of vapor and gas from outside of the pouch to inside of the pouch, and to prevent leaking of the electrolyte. The metal foil layer may be formed of any one selected from iron (Fe), carbon (C), chromium (Cr), manganese (Mn), nickel (Ni) and an alloy thereof, aluminum (Al), or an equivalent thereof, but not limited thereto. However, when the metal foil layer is formed of an iron-containing material, its mechanical strength becomes stronger, and when it is formed of an aluminum-containing material, its flexibility becomes better. Generally, aluminum metallic foil is used.

The inner resin layer constituting the pouch may include polypropylene, modified polypropylene such as casted polypropylene, a ternary copolymer of polypropylene-butylene-ethylene, and so on, as a thermal adhesive layer. The thermal adhesive layer is coated or laminated with a thickness about from 30 μm to 40 μm on other surface of the metal foil layer.

Further, an outer resin layer constituting the pouch serves as a substrate and a protective layer, and is typically composed of nylon or polyethylene terephthalate.

The microcapsules of the core-shell structure including an elastic thermoplastic compound in the cores thereof are applied along a to-be-folded portion between an inner resin layer of an upper pouch and an inner resin layer of a lower pouch.

The expression a 'to-be-folded portion of a pouch' or a 'foldable portion' as used herein refers to a portion at which folding is made after sealing of the upper pouch and the lower pouch, in order to achieve small and high-energy electrochemical device. More specifically, referring to FIG. 1, depending on the form of pouches, it refers to the two sides (A, A') in the longitudinally-facing directions, or three sides (A, A', B) when the pouch has sealing on three sides.

Microcapsules may have a core-shell structure, wherein the shell may have a thickness of about from 1/5 to 1/20 the microcapsule diameter, or a thickness ranging about from 1/5 to 1/10 the microcapsule diameter, or a thickness of about 1/10 the microcapsule diameter. Further, the shell may be formed of modified soft polymer resin such that the microcapsules are well dispersed in the inner resin layer of the pouch, for example, in casted polypropylene (CPP) or polypropylene (PP). Accordingly, even when the shell is melted or destructed (i.e., broken) by the thermal pressure, there is no possibility of leaking out of the pouch.

For example, at least a portion of the shell may have to be melted or destructed by a process of heat-sealing at a normal heat-sealing temperature ranging from 170° C. to 200° C. for from 10 to 90 minutes. Non-limiting examples of the resin constituting such shell may be, but not limited to, one or a mixture of at least two selected from the group consisting of polyester, polyethylene, polyethylene terephthalate, vinyl, polypropylene, polystyrene, polycarbonate, polyvinyl chloride, polymethyl methacrylate, polyacetal, polyoxymethylene, polybutylene terephthalate, acrylonitrile-butadiene-styrene and ethylene-vinyl alcohol copolymer.

Further, cores of microcapsules may include thermoplastic compound that has adhesive property, is curable by heat sealing, is nonreactive to electrolyte, and is elastic. For example, it is necessary that the compounds be melted by a process of heat-sealing at a temperature ranging from 170° C. to 200° C. for from 10 to 90 minutes and cured. Further, the elastic thermoplastic compound has elasticity to an extent that it can prevent occurrence of cracks by folding when a portion applied with the microcapsules is folded. Non-limiting examples of such compounds may include, but not limited to, one or a mixture of at least two selected from epoxy compounds, acrylic compounds, silicones, rubber, polyurethanes, and elastomer.

If the elastic thermoplastic compound constituting the cores is applied to the foldable portion without being surrounded by the shell structure, e.g., the elastic thermoplastic compound such as polyurethane is applied to the foldable portion, there is a problem that the elastic thermoplastic compound become brittle and the elastic thermoplastic compound also may react at undesired temperature and pressure. On the contrary, in case of microcapsules having shells according to one aspect of the present disclosure, since the shell is designed to be melted or destructed at desired temperature, there is an advantage that the side-effect is prevented while it would otherwise occur when an elastic thermoplastic compound without the shell is applied to the foldable portion.

The microcapsules may include additives as typically used in the art, and may be manufactured by a method known in the art.

The microcapsules may be manufactured to have an average diameter ranging from 0.5 μm to 2.0 μm, and be applied along the foldable portion. Further, in one preferred aspect of the present disclosure, the microcapsules may be manufactured to uniformly have an average diameter of about 1.0 μm, and be applied along the foldable portion. Since the microcapsules having small diameters described above are applied on the foldable portion, occurrence of pouch cracks can be prevented and the unnecessary increase in volume can be prevented.

The non-limiting examples of a method for applying the microcapsules between the inner resin layer of the upper pouch and the inner resin layer of the lower pouch may include screen-printing, inkjet printing, laser printing, and so on, but not particularly limited therein as long as it meets the object of the present disclosure.

Then, an electrode assembly is accommodated in the lower pouch that has space formed therein to receive the electrode assembly. If necessary, this process may be performed prior to the process for applying the microcapsules between the inner resin layer of the upper pouch and the inner resin layer of the lower pouch.

The electrode assembly may be configured in jelly-roll form in which a cathode, an anode, and a separator interposed between the cathode and the anode are wound, or configured in a stack-type electrode assembly in which these are stacked on one another.

The cathode and the anode may include a current collector, and an electrode active material, i.e., a cathode active material or an anode active material applied on at least one side of the current collector.

For the cathode, the electrode current collector may be formed by using stainless steel, nickel, aluminum, titanium or an alloy thereof, or aluminum or stainless steel surface-treated with carbon, nickel, titanium, silver, etc., and among these, aluminum or aluminum alloy is preferable.

For the anode, the electrode current collector may be formed by using stainless steel, nickel, copper, titanium or an alloy thereof, or copper or stainless steel surface-treated with carbon, nickel, titanium, silver, etc., and among these, copper or copper alloy is preferable.

The cathode active material may typically be formed by using all of lithium-containing transition metal oxide or lithium chalcogenide compounds, and representative examples may include metal oxide such as $LiCoO_2$, $LiNiO_2$, $LiMnO_2$, $LiMn_2O_4$, or $LiNi_{1-x-y}Co_xM_yO_2$ ($0 \leq x \leq 1$, $0 \leq y \leq 1$, $0 \leq x+y \leq 1$, where M is a metal such as Al, Sr, Mg, La, and so on). The anode active material may be formed of carbonaceous materials such as crystalline carbon, amorphous carbon, carbon composite, carbon fiber, and so on, lithium metal, lithium alloys, and so on.

The separator prevents short circuit between the cathode and the anode and provides a moving passage for lithium ions, in which the separator may include polyolefin-based polymer film such as polypropylene, polyethylene, and so on, or multilayer film thereof, known materials such as microporous film, and woven and non-woven fabrics.

Cathode tab and anode tab are conductably attached to the cathode and anode of the electrode assembly, respectively, by a conductive adhesive, or by welding such as laser welding, ultrasonic welding, resistance welding, and so on.

These electrode tabs may be formed to protrude from the electrode assembly vertically in a winding direction of the electrode assembly. The cathode tabs and the anode tabs of the electrode assembly may be drawn out through a sealing portion located in a side opposite to the side connected to the lower pouch and the upper pouch of the sealing portion. A protective tape is attached to the electrode tab made of insulating material such that short circuit between electrodes is prevented.

Then, the periphery of the pouch is heat-sealed. The heat-sealing may be carried out in a typical way known in the art, and heat having a temperature in the vicinity of the melting point of the inner resin layer of the exterior material for the pouch may be applied to the sealing portion under a predetermined pressure. A non-limiting examples may involve heat-sealing by applying a high temperature ranging from 170° C. to 200° C. for from 10 to 90 minutes under pressure.

Mode for Disclosure

A pouch-type secondary battery according to the one embodiment of the present disclosure will be discussed with reference to FIG. 2.

Figure 2:
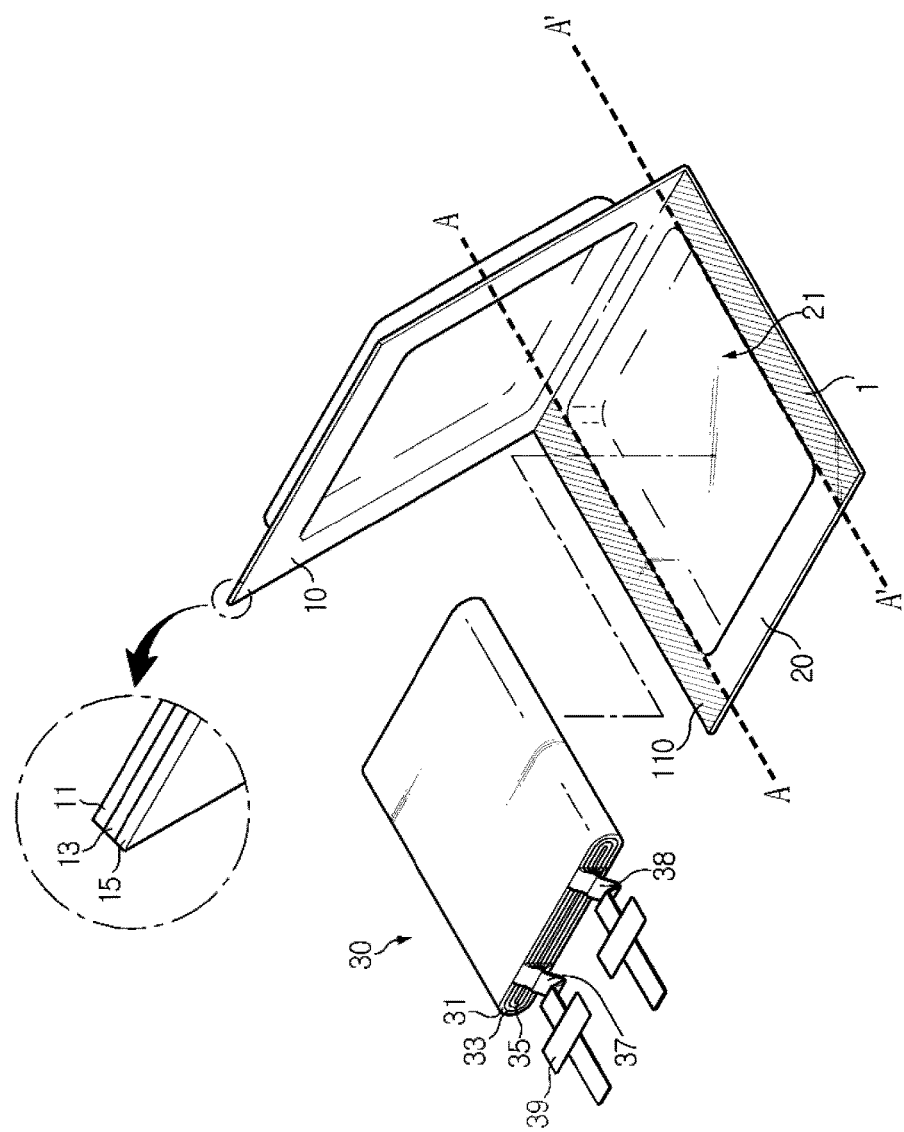
FIG. 2 is a schematic perspective view of a pouch-type secondary battery according to an embodiment of the present disclosure.

Referring to FIG. 2, the pouch is formed in a multilayer film structure formed by sequentially stacking: a polyolefin-based resin layer as an inner resin layer 15 that has thermal adhesive property to serve as a sealing material; an aluminum layer as a metal layer 13 to serve as a substrate which maintains mechanical strength and also as a barrier layer against moisture and oxygen; and a nylon layer as an outer resin layer 11 to serve as a substrate and a protective layer.

Further, the pouch is mainly divided into a lower pouch 20 in which an accommodating portion 21 is formed, and an upper pouch 10 covering the same. The electrode assembly 30 is received in the accommodating portion 21, and the electrode assembly 30 includes a cathode 31, an anode 35, and a separator 33 interposed between the cathode 31 and the anode 35. Tabs 37 and 38 are drawn from each electrodes, and a tape 39 is attached to the tabs 37 and 38.

Further, microcapsules are applied along foldable portions A and A'. Then, in a subsequent process, sealing portions 110 and 120 are formed by heat-sealing the periphery of the pouch, after which folding is carried out along the foldable portions A and A'.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

DESCRIPTION OF REFERENCE NUMERALS

10: upper pouch
11: outer resin layer
13: metal layer
15: inner resin layer
20: lower pouch
21: accommodating portion for electrode assembly
A, A': foldable portions
30: electrode assembly
31: cathode
33: separator
35: anode
37, 38: electrode tabs
39: tape
110, 120: pouch sealing portion

What is claimed is:

1. A secondary battery pouch, wherein microcapsules of a core-shell structure are applied between an inner resin layer of an upper pouch and an inner resin layer of a lower pouch along a to-be-folded portion of the pouch,
the microcapsules include an elastic thermoplastic resin in the core thereof, and
the shell is formed of one or a mixture of at least two selected from the group consisting of polyethylene, polyethylene terephthalate, polypropylene, polycarbonate, polyvinyl chloride, polyacetal, polyoxymethylene, polybutylene terephthalate, acrylonitrile-butadiene-styrene and ethylene-vinyl alcohol copolymer.

2. The secondary battery pouch of claim 1, wherein at least a portion of the shell is melted or destructed by thermal bonding process at from 170° C. to 200° C.

3. The secondary battery pouch of claim 1, wherein the elastic thermoplastic resin is melted at from 170° C. to 200° C. and cured.

4. The secondary battery pouch of claim 1, wherein the elastic thermoplastic resin is one or a mixture of at least two selected from epoxy compounds, acrylic compounds, silicones, rubber, polyurethanes, and elastomer.

5. The secondary battery pouch of claim 1, wherein the microcapsules have an average diameter ranging from 0.5 μm to 2 μm.

6. The secondary battery pouch of claim 1, wherein a thickness of the shell corresponds to from 1/5 to 1/10 the diameter of microcapsules.

7. A pouch-type secondary battery comprising:
an electrode assembly including a cathode, an anode, and a separator interposed between the cathode and the anode; and
the secondary battery pouch according to claim 1, the secondary battery pouch having an accommodating portion to receive the electrode assembly therein,
wherein a sealing portion is formed on two sides or three sides of the secondary battery pouch,
the sealing portion is folded, and
a cured elastic thermoplastic resin is further formed in the folded portion.

8. The pouch-type secondary battery of claim 7, wherein the cured elastic thermoplastic resin is one or a mixture of at least two selected from epoxy compounds, acrylic compounds, silicones, rubber, polyurethanes, and elastomer.

9. A method for manufacturing a secondary battery pouch of claim 1, the method comprising:
applying the microcapsules of the core-shell structure including the elastic thermoplastic resin in the core thereof by screen printing, inkjet printing or laser printing, between the inner resin layer of the upper pouch and the inner resin layer of the lower pouch along the to-be-folded portion of the pouch.

10. A method for manufacturing a pouch-type secondary battery comprising:
receiving a secondary battery in the secondary battery pouch of claim 1;
heat-sealing a periphery of the secondary battery pouch; and
folding a sealing portion.

11. A method for manufacturing a pouch-type secondary battery comprising:
receiving a secondary battery in a secondary battery pouch, wherein microcapsules of a core-shell structure are applied between an inner resin layer of an upper pouch and an inner resin layer of a lower pouch along a to-be-folded portion of the pouch, the microcapsules include an elastic thermoplastic resin in the core thereof;
heat-sealing a periphery of the secondary battery pouch; and
folding a sealing portion,
wherein the heat-sealing is performed by the thermal bonding which is carried out at a temperature ranging from 170° C. to 200° C.

* * * * *